United States Patent
Hoffman et al.

(10) Patent No.: US 9,736,467 B2
(45) Date of Patent: Aug. 15, 2017

(54) APPARATUS AND METHOD FOR ADJUSTING STEREOSCOPIC IMAGES IN RESPONSE TO HEAD ROLL

(71) Applicant: SAMSUNG DISPLAY CO., LTD., Yongin, Gyeonggi-Do (KR)

(72) Inventors: David M. Hoffman, Fremont, CA (US); Richard I. McCartney, Scotts Valley, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 465 days.

(21) Appl. No.: 14/253,821

(22) Filed: Apr. 15, 2014

(65) Prior Publication Data
US 2015/0035954 A1    Feb. 5, 2015

Related U.S. Application Data (60) Provisional application No. 61/862,482, filed on Aug. 5, 2013.

(51) Int. Cl.
*H04N 13/04*     (2006.01)
*H04N 13/00*     (2006.01)

(52) U.S. Cl.
CPC ..... *H04N 13/0479* (2013.01); *H04N 13/0022* (2013.01); *H04N 13/0429* (2013.01)

(58) Field of Classification Search
CPC ............ H04N 13/0479; H04N 13/0402
See application file for complete search history.

(56) References Cited

U.S. PATENT DOCUMENTS

| | | | | |
|---|---|---|---|---|
| 6,163,336 A | * | 12/2000 | Richards | G02B 27/0093 348/42 |
| 7,705,876 B2 | * | 4/2010 | Starkweather | H04N 13/0402 348/51 |
| 8,045,792 B2 | * | 10/2011 | Koo | H04N 13/0018 382/154 |
| 8,213,708 B2 | * | 7/2012 | Singhal | G06K 9/00201 382/154 |
| 8,373,573 B2 | * | 2/2013 | Chou | H04N 13/0479 340/666 |
| 8,488,243 B2 | * | 7/2013 | McKnight | A63F 13/06 359/237 |

(Continued)

FOREIGN PATENT DOCUMENTS

| | | |
|---|---|---|
| CN | 102149001 A | 8/2011 |
| CN | 102197653 A | 9/2011 |

(Continued)

OTHER PUBLICATIONS

EPO Search Report dated Jun. 30, 2015, for corresponding European Patent application 14176015.7, (10 pages).

(Continued)

*Primary Examiner* — Jay Patel
*Assistant Examiner* — Irfan Habib
(74) *Attorney, Agent, or Firm* — Lewis Roca Rothgerber Christie LLP (57) ABSTRACT

A stereoscopic display includes: a sensor configured to detect head roll of a viewer; and an image renderer coupled to the sensor and configured to adjust a 3D image according to the detected head roll.

12 Claims, 9 Drawing Sheets

(56) References Cited

U.S. PATENT DOCUMENTS

| | | | | |
|---|---|---|---|---|
| 8,760,502 B2* | 6/2014 | Yoon | H04N 13/0239 | 348/49 |
| 8,768,044 B2* | 7/2014 | Hong | G06T 7/593 | 382/154 |
| 8,810,564 B2* | 8/2014 | Nam | H04N 13/0022 | 345/419 |
| 8,823,782 B2* | 9/2014 | Karaoguz | G06F 3/011 | 348/51 |
| 8,854,531 B2* | 10/2014 | Karaoguz | H04N 13/0404 | 348/348 |
| 8,885,882 B1* | 11/2014 | Yin | G06F 3/00 | 382/103 |
| 8,907,983 B2* | 12/2014 | McArdle | G06F 3/0481 | 345/633 |
| 8,994,797 B2* | 3/2015 | Yoshino | H04N 13/0438 | 345/156 |
| 9,077,980 B2* | 7/2015 | Takagi | H04N 5/23258 | |
| 9,188,849 B2* | 11/2015 | Yamashita | G03B 35/08 | |
| 9,201,242 B2* | 12/2015 | Miyawaki | G02B 27/017 | |
| 9,277,207 B2* | 3/2016 | Ushiki | H04N 13/0011 | |
| 9,313,475 B2* | 4/2016 | Routhier | H04N 13/0022 | |
| 9,319,655 B2* | 4/2016 | Lee | H04N 13/0022 | |
| 9,549,167 B2* | 1/2017 | Ushiki | H04N 13/0022 | |
| 9,557,811 B1* | 1/2017 | Bozarth | G06K 9/00604 | |
| 9,565,415 B2* | 2/2017 | Zhang | H04N 13/0018 | |
| 9,584,797 B2* | 2/2017 | Hyde | H04N 13/0468 | |
| 9,600,923 B2* | 3/2017 | Redmann | G06T 15/04 | |
| 2006/0061652 A1 | 3/2006 | Sato et al. | | |
| 2008/0112616 A1* | 5/2008 | Koo | H04N 13/0022 | 382/171 |
| 2009/0096863 A1* | 4/2009 | Kim | G06K 9/00604 | 348/42 |
| 2011/0310982 A1* | 12/2011 | Yang | H04N 13/0003 | 375/240.26 |
| 2012/0038635 A1* | 2/2012 | Stamate | H04N 13/0278 | 345/419 |
| 2012/0098931 A1* | 4/2012 | Wirtz | H04N 13/0402 | 348/43 |
| 2012/0113235 A1 | 5/2012 | Shintani | | |
| 2013/0235169 A1* | 9/2013 | Kato | G02B 27/01 | 348/53 |
| 2015/0035954 A1* | 2/2015 | Hoffman | H04N 13/0479 | 348/54 |

FOREIGN PATENT DOCUMENTS

| | | |
|---|---|---|
| CN | 102457751 A | 5/2012 |
| EP | 2 448 283 A2 | 5/2012 |
| JP | 2012-063477 | 3/2012 |
| KR | 10-2006-0134153 A | 12/2006 |
| KR | 10-2011-0133139 A | 12/2011 |
| KR | 10-2013-0037032 A | 4/2013 |
| WO | WO 2012/156489 A1 | 11/2012 |

OTHER PUBLICATIONS

European Search Report; Application Serial No. 14176015.7, dated Feb. 5, 2015, 6 sheets.

SIPO Office Action dated Mar. 3, 2017, for corresponding Chinese Patent Application No. 201410347405.2 (6 pages).

* cited by examiner

APPARATUS AND METHOD FOR ADJUSTING STEREOSCOPIC IMAGES IN RESPONSE TO HEAD ROLL

CROSS-REFERENCE TO RELATED APPLICATION

This patent application claims priority to and the benefit of U.S. Provisional Application Ser. No. 61/862,482, filed Aug. 5, 2013, titled "Compensation Technique for Head-Roll in Stereo Image Viewing," the entire content of which is incorporated herein by reference.

BACKGROUND

1. Field

Embodiments of the present invention relate to stereo image display devices.

2. Related Art

Stereo image displays, or 3D displays, have become increasingly popular for use in, for example, home televisions, movie theaters, portable display devices, etc. These 3D displays provide an immersive experience for a viewer by allowing the viewer to perceive depth to the displayed images.

Generally, image content for 3D displays is created with the expectation that the viewer will watch the images with their head in a vertical upright position (i.e., with no head roll). However, if the viewer desires to relax their posture and view the 3D images with their head in a non-vertical position (i.e., with head roll), the viewer may perceive a loss of the depth sensation, and may experience image crosstalk, eyestrain, and/or discomfort.

Because people may sometimes prefer to relax to more comfortably watch a 3D display, people may prefer to not maintain a vertical head posture. For example, a viewer may prefer to lie down (e.g., on a couch at home) while watching a movie on a 3D television, which would result in head roll of the viewer, thereby causing an inferior and uncomfortable 3D viewing experience.

SUMMARY

Aspects of embodiments of the present invention are directed toward adjusting stereoscopic images in response to a viewer's head roll.

According to one embodiment of the present invention, a stereoscopic display includes: a sensor configured to detect head roll of a viewer; and an image renderer coupled to the sensor and configured to adjust a 3D image according to the detected head roll.

The image renderer may be configured to adjust disparities between a right image and a left image of the 3D image according to an angle of the head roll of the viewer.

The sensor may be configured to measure the angle of the head roll by measuring a degree of rotation of an interocular axis of the viewer.

The image renderer may be configured to rotate the direction of the disparities between the right image and the left image to correspond to the degree of rotation of the interocular axis of the viewer.

The image renderer may be configured to increasingly attenuate magnitudes of the disparities between the right image and the left image as the angle of the detected head roll increases.

The image renderer may be configured to adjust the direction of the disparities by keeping the left image static and by relocating the right image with respect to the left image to form a relocated right image.

The image renderer may be configured to calculate coordinates of pixels of the relocated right image based on coordinates of pixels of the left image when the angle of the head roll is less than a reference head roll angle based on coordinates of pixels of the right image when the angle of the head roll is greater than or equal to the reference head roll angle.

The reference head roll angle may be about 45 degrees.

The image renderer may be configured to adjust the 3D image when an angle of the detected head roll exceeds a threshold head roll angle.

According to another embodiment of the present invention, a stereoscopic display includes: a sensor configured to detect a first head roll of a first viewer, and to detect a second head roll of a second viewer; and an image renderer coupled to the sensor and configured to adjust a 3D image according to the first head roll, and to adjust the 3D image according to the second head roll.

The image renderer may be configured to adjust a direction of disparities between a right image and a left image of the 3D image according to the first head roll, and to adjust the direction of the disparities between the right image and the left image according to the second head roll.

The image renderer may be configured to adjust the direction of the disparities by keeping the left image static and by relocating the right image with respect to the left image according to the first head roll to form a first relocated right image, and by relocating the right image with respect to the left image according to the second head roll to form a second relocated right image.

The left image may be configured to be commonly seen by the first viewer and by the second viewer, wherein the first relocated right image may be configured to be seen by the first viewer, and wherein the second relocated right image may be configured to be seen by the second viewer.

According to another embodiment of the present invention, a method for adjusting a 3D image in response to head roll of a viewer includes: detecting the head roll of the viewer; and adjusting a 3D image according to the detected head roll.

The adjusting may include adjusting a direction of disparities between a right image and a left image of the 3D image according to an angle of the detected head roll.

The angle of the detected head roll may correspond to a degree of rotation of an interocular axis of the viewer.

The adjusting may further include rotating the direction of the disparities between the right image and the left image to correspond to the degree of rotation of the interocular axis of the viewer.

The method may further include increasingly attenuating magnitudes of the disparities between the right image and the left image as the angle of the detected head roll increases.

The adjusting disparities may include keeping the left image static and relocating the right image with respect to the left image to form a relocated right image.

The 3D image may be adjusted when an angle of the detected head roll exceeds a threshold head roll angle.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

The discomfort and the degradation of the 3D experience that result from viewing a 3D image with a tilted head (e.g., a head "roll," as in yaw, pitch, and roll) is primarily due to 3D image content being conventionally designed for horizontally separated eyes that are aligned with the horizontal axis of the display. That is, the separation, or disparity, between a right image and a left image (e.g., a right eye image and a left eye image) of a given 3D image is conventionally designed to be in a horizontal direction such that horizontally disparate points of the right and left images fall within the same lateral plane as the eyes of a viewer with no head roll. In other words, the interocular axis of the viewer (e.g., a line connecting both eyes of the viewer, passing through the center of both eyes, and rotating about a point between both eyes) is parallel to an axis corresponding to the disparity (e.g., positional disparity) of the left image and the right image of the 3D image.

Disparity of a 3D image, as used herein, refers to the difference in physical location on a display between a left image and a right image, which combine to form a 3D image, for example, when viewed through polarized 3D eyewear. The right image and the left image are typically similar images except for a difference in physical locations of the right and left images on a display. The disparity between the left image and the right image includes a direction, for example, the general direction on the display in which the right image is separate from the left image, or vice versa. As discussed above, conventional 3D displays only incorporate a horizontal direction of disparity between right and left images.

The direction of disparity between a left image and a right image may correspond to differences in set reference points between the left image and the right image. For example, the direction of disparity between a left image and a right image may refer to the common direction of disparities between every pixel of the right image and every pixel of the left image.

The disparity between the left image and the right image also includes a magnitude, that is, the amount of separation between the two images. A magnitude of disparity between a left image and a right image of a 3D image may vary throughout the 3D image (e.g., from pixel to pixel), depending on the desired 3D effect of certain points of the 3D image corresponding to the degree of depth that is intended to be conveyed.

Figure 1A:
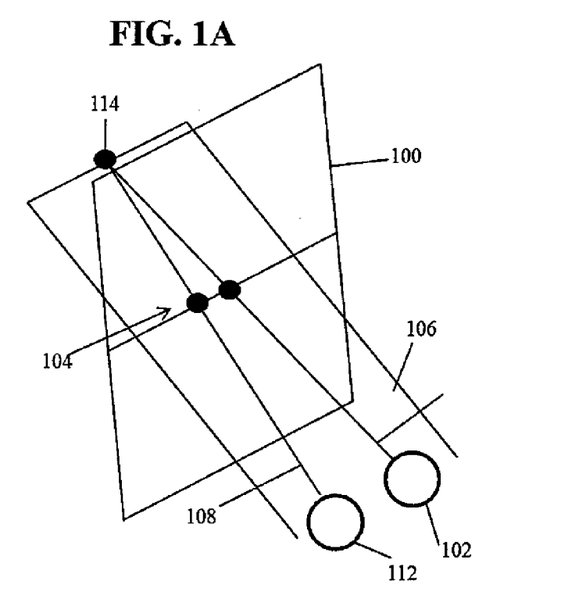
FIGS. 1A and 1B are perspective views illustrating lines of vision in relation to a 3D display surface respectively corresponding to the absence and presence of head roll.
Figure 1B:
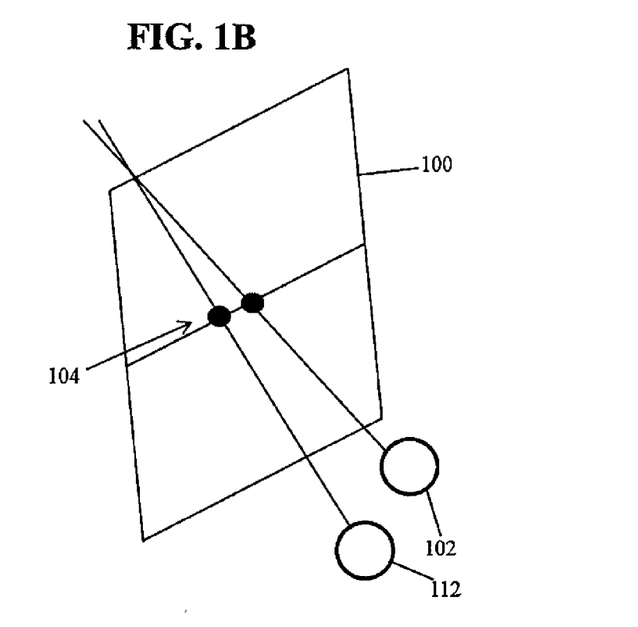

FIGS. 1A and 1B are perspective views illustrating lines of vision in relation to a 3D display surface respectively corresponding to the absence and presence of head roll.

FIG. 1A illustrates a situation where a viewer watches a 3D display surface 100 with no head roll. The viewer's left eye 112 and right eye 102 are horizontal, and are in the same plane 106 as two horizontally depicted disparate points 104. These disparate points 104, which respectively correspond to the left eye 112 and the right eye 102, cause a 3D effect when viewed through, for example, a pair of 3D glasses, wherein the leftmost of the disparate points 104 is perceived by the left eye 112, and not the right eye 102, and wherein the rightmost of the disparate points 104 is perceived by only the right eye 102. When there is no head roll, the viewer may fixate on the disparate points 104 with a simple horizontal convergence eye movement, as illustrated by right eye line of vision 110 laterally converging with left eye line of vision 108. The right eye line of vision 110 and the left eye line of vision 108 eventually intersect behind the 3D display surface 100 at focal point 114, which corresponds to a 3D point to the viewer that is perceived as being farther than the surface of the display 100.

FIG. 1B illustrates a situation where a viewer watches the 3D display surface 100 with head roll (e.g., a head that is tilted with respect to the orientation of the display). FIG. 1B illustrates head roll to the left, as the viewer's left eye 112 is at a height that is closer to the location of the bottom of the display 100 when compared with the right eye 102. Here, because the left eye 112 is at a different elevation than that of the right eye 102 due to the head roll, vertical convergence occurs, that is, the left eye rotates upwards while the right eye rotates downwards. Eye movement associated with the vertical convergence while viewing stereoscopic images may lead to adverse effects such as eyestrain, double images, and loss of depth.

Accordingly, to compensate for the vertical convergence occurring during head roll while viewing a 3D display, embodiments of the present invention adjust disparities of 3D images generated by the 3D display, thereby reducing the negative effects of head roll associated with conventional 3D display devices.

Figure 2A:
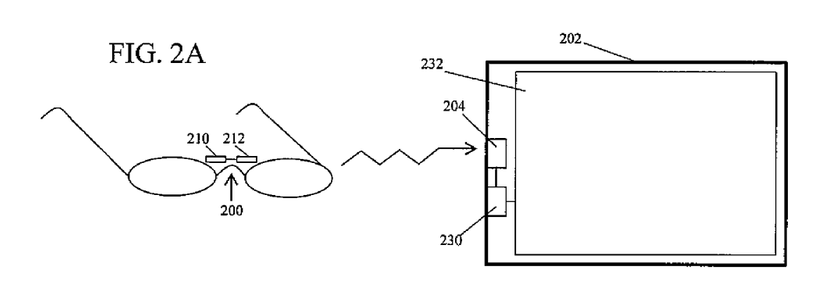
FIGS. 2A, 2B, and 2C are diagrams illustrating systems for viewing 3D images according to different embodiments of the present invention.
Figure 2B:
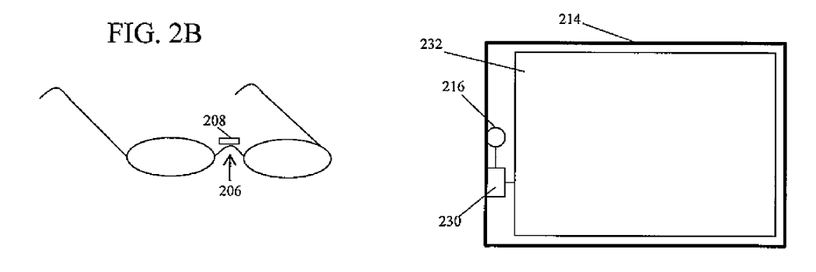
Figure 2C:
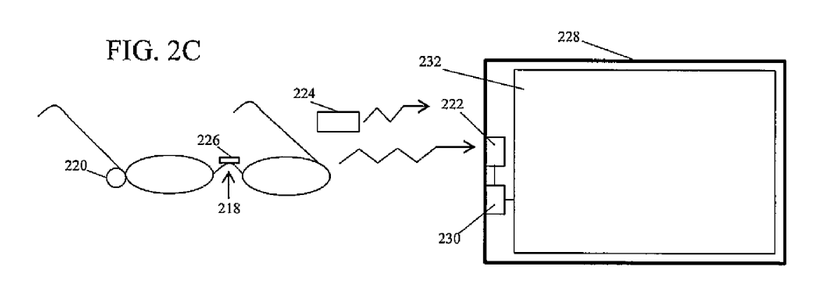

FIGS. 2A, 2B, and 2C are diagrams illustrating apparatuses for viewing 3D images according to different embodiments of the present invention.

Referring to FIG. 2A, the system includes eyewear 200. The eyewear 200 may be any type of eyewear worn by a viewer in conjunction with a 3D display to achieve the desired 3D effect. For example, eyewear 200 may be active shutter glasses, polarized glasses, interference filter glasses, anaglyph glasses, or any 3D eyewear known in the art. Within the eyewear 200 of the present embodiment, there may be a sensor 210 for determining whether or not head roll occurs by a user of the eyewear 200, and for determining an angle or degree of the head roll. The sensor 210 may be an accelerometer or any other device capable of detecting the degree of the head roll. Additionally, the sensor 210 is coupled to transmitter 212 for sending information corresponding to the head roll to a receiver 204 that is coupled to a 3D display 202, so that the received information may be used to adjust disparities of the 3D images generated by the 3D display 202. In other embodiments of the present invention, the sensor 210 may be coupled to a processor for converting the raw head roll information into input data that the 3D display 202 may utilize to re-render images.

The 3D display 202 further includes an image renderer 230 and a display area 232. The image renderer 230 may calculate disparity maps for 3D images displayed on the 3D display 202. The image renderer 230 may also adjust or compensate the calculated disparity maps to generate 3D images based on the adjusted/compensated disparity maps. The image renderer 230 may calculate the adjusted disparity maps based on the detected viewer head roll information sent to the image renderer 230 from the receiver 204. After the image renderer 230 generates 3D images having adjusted disparities according to the viewer head roll, the image renderer 230 sends the adjusted 3D images to the display area 232 for viewing.

The 3D display 202 may be any of a variety of 3D displays known in the art. For example, the 3D display 202 may be a television, a movie screen, a portable video game display, a cellular phone display, a computer screen, etc.

In some embodiments of the present invention, the 3D display simulcasts multiple image streams appropriate for various head roll angles, and the eyewear 200 may select and allow the 3D image having an appropriate disparity corresponding to a user's given head roll, while filtering out others of the 3D image having non-matching disparities. For example, the 3D display 202 may simulcast multiple disparities of an image, the disparities each corresponding to head roll of 10 degree increments. The sensor 210 may then determine the degree of head roll of the viewer, and may then instruct the eyewear 200 to filter in an image having disparities that most closely correspond to the degree of the viewer's head roll.

Referring to FIG. 2B, a 3D display 214 may include an optical tracking sensor 216 that optically determines the eyewear 206 roll angle, which corresponds to the angle/degree of head roll of a viewer wearing the eyewear 206. The eyewear 206 includes a reflector 208 that allows the optical tracking sensor 216 to determine the head roll of the user of the eyewear 206. In other embodiments of the present invention, the optical tracking sensor 216 may be a camera that is used in conjunction with face detection algorithms to detect an orientation of a viewer's head, the orientation corresponding to head roll. Additionally, physiological theory of head roll may be utilized to slightly under-compensate for the measured head roll, which is made possible by cyclorotational eye movements.

Referring to FIG. 2C, eyewear 218 of embodiments of the present invention may include a knob 220 that allows a user to manually calibrate the images on the 3D display 228 such that the disparities of the images are aligned with the user's interocular axis, which has been rotationally shifted due to head roll. The knob 220 may be anything that allows a user to input commands, such as an input pad, a throttle, a dial, etc. The eyewear 218 then communicates the desired calibrated disparity using a transmitter 226 communicating with a receiver 222 coupled to the 3D display 228. Furthermore, according to other embodiments of the present invention, the user-implemented calibration of disparities may be accomplished using a remote 224.

Figure 3:
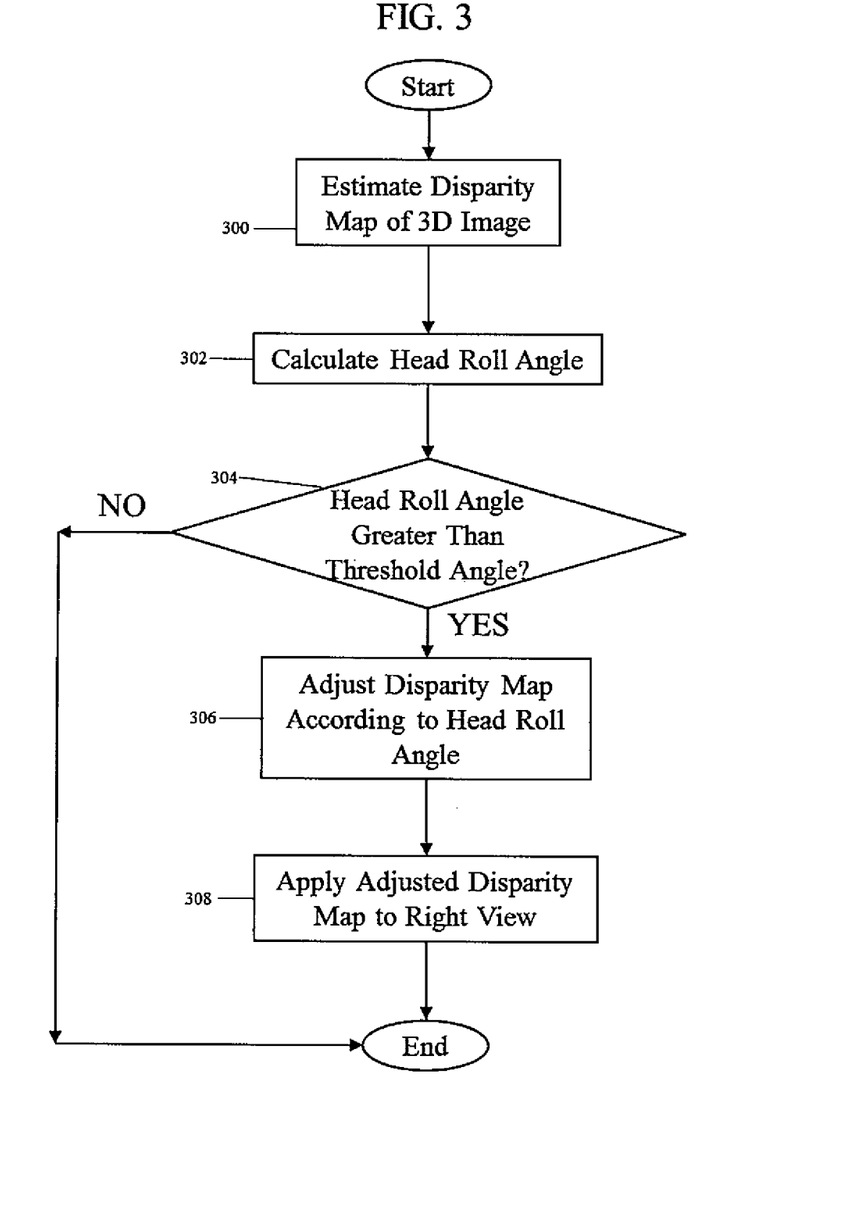
FIG. 3 is a flow chart illustrating a method for adjusting stereoscopic images according to an embodiment of the present invention.

FIG. 3 is a flow chart illustrating a method for adjusting stereoscopic images according to an embodiment of the present invention.

Referring to FIG. 3, in operation 300, disparities of a given 3D image are estimated to generate a disparity map. In some embodiments, disparity may be estimated in real-time by utilizing a graphics processing unit (GPU) and rapid searches for corresponding points in left and right images, which are used to create the 3D image. In other embodiments, disparity May be estimated from meta-data that may be included with the 3D content, or may be estimated from meta-data that may be available from the cloud. The estimated disparity map of a 3D image may be dense enough such that there is a disparity associated with every pixel of the 3D image. Moreover, smoothness priors may be utilized to fill in missing values, as will be known to one of ordinary skill in the art.

In operation 302, the head roll angle of the viewer is detected and calculated. The head roll angle may be calculated in a number of ways. For example, the head roll angle may be calculated by using a horizontal reference axis between the viewer's eyes (e.g., the interocular axis) and by determining the head roll according to the degree of rotational displacement of the viewer's interocular axis. The interocular axis may be an axis that laterally intersects the viewer's eyes and that rotates around a center point between the eyes. However, embodiments of the present invention are not limited to the above, as the reference axis and the axis used to measure the degree of head roll from the reference axis may be any suitable measurement locations, such as vertical axes.

At operation 304, it is determined whether the degree of the head roll angle is greater than a reference head roll angle or degree. If the detected head roll angle is less than or equal to the reference head roll angle, the process bypasses operations 306 and 308. In this case, the display presents the original uncompensated right view image to the viewer, and thus the original 3D image is displayed to the viewer, with no adjustment.

In other embodiments of the present invention, the calculation of the head roll angle at operation 302 and the determination of whether or not the head roll angle is greater than a threshold angle at operation 304 may occur before the estimation of the disparity map at operation 300. In this alternative embodiment, if the head roll angle is determined to be less than or equal to the threshold angle, the process ends and the original 3D image is displayed to the viewer. On the other hand, if the head roll angle is determined to be greater than the threshold angle, the process advances to estimation of the disparity map (e.g., operation 300), then to adjustment of the disparity map according to the head roll (e.g., operation 306), and then to application of the adjusted disparity map (e.g., operation 308).

If the detected head roll angle is greater than the reference head roll angle, the process continues. As an example, the reference head roll angle may be 10 degrees, and if the detected head roll angle is 10 degrees or less, the process will simply generate a disparity map for the next 3D image. Alternatively, if the detected head roll angle is greater than 10 degrees, the process proceeds to operation 306. However, embodiments of the present invention are not limited to the above, as the reference head roll angle may be any angle, or operation 304 may be omitted altogether, and operation 302 may directly precede operation 306.

In operation 306, the disparity map estimated in operation 300 is adjusted or compensated according to the calculated head roll angle. Several different image adjustment techniques will be described in more detail below. The adjusted disparity map is then applied to the right view of the viewer in operation 308, which corresponds to the right image. In other embodiments of the present invention, the adjustment may instead be applied to the left view/left image, or may be concurrently applied to both of the left view and the right view.

Figure 4A:
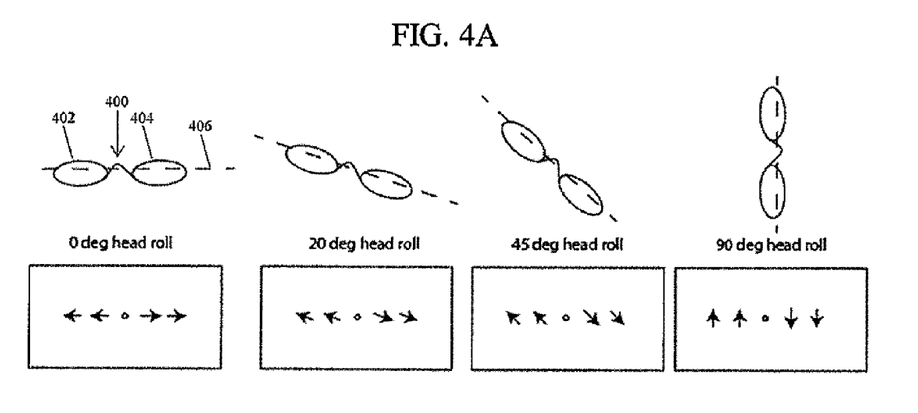
FIG. 4A illustrates adjustment of a disparity map of a stereoscopic image in response to head roll, according to an embodiment of the present invention.
Figure 4B:
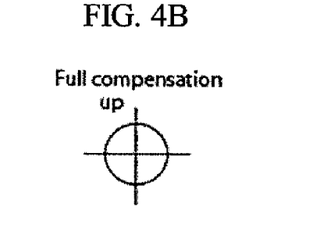
FIG. 4B is a polar graph illustrating disparity magnitude as a function of head roll, according to the embodiment of the present invention shown in FIG. 4A.

FIG. 4A illustrates adjustment of a disparity map of a stereoscopic image in response to head roll, according to an embodiment of the present invention, and FIG. 4B is a polar graph illustrating disparity magnitude as a function of head roll, according to the embodiment of the present invention shown in FIG. 4A.

FIG. 4A illustrates an approach that may be used corresponding to operation 306 of FIG. 3, that is, FIG. 4A illustrates one approach to adjusting a disparity map according to a detected head roll angle, according to embodiments of the present invention. FIG. 4A shows how disparities of a given 3D image are adjusted in response to specific degrees of head roll in accordance with the present embodiment. The arrows of the 3D image indicate a direction of shift between a corresponding feature in the right and left eyes (i.e., the direction of disparity between the left and right images of the 3D image). FIG. 4A illustrates a representation of head roll through eyewear 400 including left eye 402, right eye 404, and interocular axis 406, such that the illustrated depictions of head roll occur from the left-hand side to the right-hand side of a viewer of the 3D image.

Referring to FIG. 4A, the disparities of the 3D image are rotated and adjusted depending on the degree of head roll detected, that is, the disparities follow the same orientation as the detected head roll, such that the direction of the disparities and the interocular axis 406 are parallel. Additionally, the adjustment technique according to this embodiment of the present invention maintains the disparity magnitudes of each disparity irrespective of the angle of head roll. For example, and as shown in FIG. 4A, a 0-degree head roll (i.e., when a viewer does not exhibit any head roll) corresponds to no change in disparity orientation (i.e., 0-degree rotation of disparity) because the viewer is viewing the 3D image as intended, and thus, there is no need for adjustment of the 3D image. However, a 20-degree, 45-degree, and 90-degree head roll cause the disparities of the 3D image to respectively rotate 20 degrees, 45 degrees, and 90 degrees, as shown in FIG. 4A. A disparity rotation in an opposite direction from that of the above described rotation may occur if the head roll occurs in the opposite direction (i.e., from the right-hand side to the left-hand side of the viewer), with the degree of rotation of the disparities corresponding to the degree of the head roll.

Referring to FIG. 4B, the magnitude of the disparities remains constant for all head roll angles, which results in preservation of full depth sensation regardless of the position of the viewer's head. This feature of constant disparity magnitude is also reflected in FIG. 4A by the disparity vectors/arrows having constant length for all head roll angles. According to this embodiment, the 3D image horizontal direction remains unchanged, but the right image to be perceived by the right eye 404 is shifted tangentially about a corresponding point of the left image to be perceived by the left eye 402, such that the perceived disparity for the rolled head position is unchanged, and such that no vertical convergence eye movement occurs, thereby reducing the negative effects experienced by the viewer. However, other embodiments of the present invention may alternatively shift the left eye image about the right eye image, or may shift both of the left eye image and the right eye image.

Figure 5A:
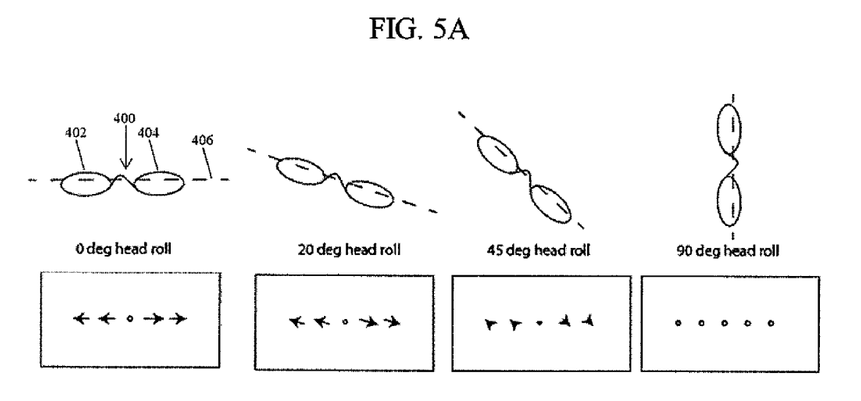
FIG. 5A illustrates adjustment of a disparity map of a stereoscopic image in response to head roll, according to another embodiment of the present invention.
Figure 5B:
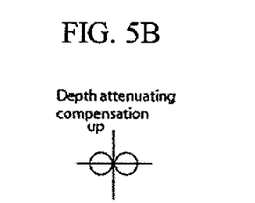
FIG. 5B is a polar graph illustrating disparity magnitude as a function of head roll, according to the embodiment of the present invention shown in FIG. 5A.

FIG. 5A illustrates adjustment of a disparity map of a stereoscopic image in response to head roll, according to another embodiment of the present invention, and FIG. 5B is a polar graph illustrating disparity magnitude as a function of head roll, according to the embodiment of the present invention shown in FIG. 5A.

Referring to FIG. 5A, the rotation of the disparities of the image is responsive to the head roll of the viewer in the same manner as that of the embodiment of the present invention described above in FIG. 4A. That is, the disparities are rotated to have a direction that remains parallel with the viewer's interocular axis 406. However, in contrast to the embodiment of FIGS. 4A and 4B, the present embodiment increasingly reduces the disparity magnitude of the 3D image as the degree of the viewer's head roll increases. At the extreme case when the head is rolled 90 degrees, the disparity magnitude may be fully attenuated. At this position, the images displayed to the right eye 402 and the left eye 404 are identical, and there is no depth sensation to the attenuated 3D image. FIG. 5A illustrates this attenuation of the magnitude of disparity, as the disparity arrows/vectors reduce in length as the degree of head roll increases until there is no disparity, the lack of disparity depicted by the dots/circles that correspond to a 90 degree head roll. The polar plot of FIG. 5B also depicts the correlation of attenuation of disparity with an increase of the degree of head roll.

By adjusting the orientation of the disparities in conjunction with reducing their magnitudes as the degree of head roll increases, not only are vertical convergence eye movement and the associated negative effects reduced, but also image quality is maintained despite the increasing viewer head roll.

In other embodiments of the present invention, the attenuation of the magnitude of the disparities is such that the disparities are not completely eliminated, but are instead limited to a fraction of the original depth (e.g., 10% of the original depth), thereby retaining some of the depth sensation at the more extreme head roll positions while still decreasing challenges associated with re-rendering.

Figure 6A:
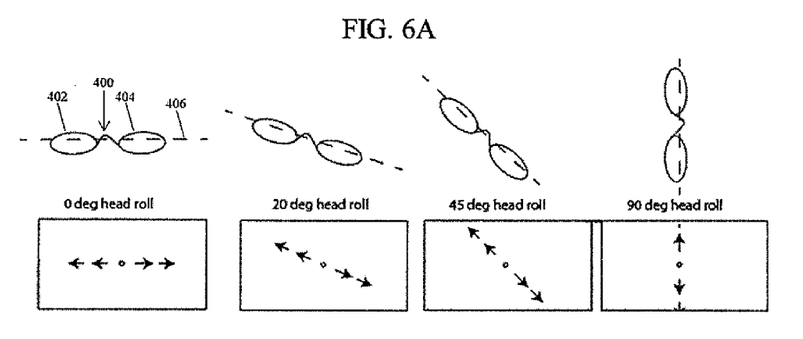
FIG. 6A illustrates adjustment of a disparity map of a stereoscopic image in response to head roll, according to another embodiment of the present invention.
Figure 6B:
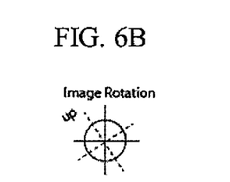
FIG. 6B is a polar graph illustrating disparity magnitude as a function of head roll, according to the embodiment of the present invention shown in FIG. 6A.

FIG. 6A illustrates adjustment of a disparity map of a stereoscopic image in response to head roll, according to another embodiment of the present invention, and FIG. 6B is a polar graph illustrating disparity magnitude as a function of head roll, according to the embodiment of the present invention shown in FIG. 6A.

Referring to FIG. 6A, instead of rotating individual disparities of a 3D image as shown in FIGS. 4A and 5A, the embodiment shown in FIG. 6A rotates an entire image (e.g., the 3D image) in response to head roll. FIG. 6A illustrates the rotation of a collective row of vectors/arrows (i.e., disparities) in response to the different degrees of head roll. The present embodiment concurrently rotates the right and left images on the display to match the head roll angle. Consequently, vertical eye convergence is decreased at any head roll angle, and no image deformities are introduced as part of the disparity adjustment/disparity warping process. In some embodiments of the present invention, the 3D image may be zoomed out to retain the full image as the image is rotated (e.g., so edges of the 3D image are not clipped due to portions of the 3D image rotating beyond the perimeter of the display). In other embodiments of the present invention, the image may be magnified, or "zoomed in," so that the display remains fully filled as the image is rotated (e.g., so the edges of the display screen can display content present in the 3D image, which may have an aspect ratio that is not 1:1).

Referring to FIG. 6B, the polar plot describes the constant magnitude of the disparities at any head roll angle. Additionally, the dotted axis lines depict an example of a new orientation of the image after rotation, with the top of the image indicated by "up." The dotted axis of FIG. 6B illustrates, for example, a new 45-degree orientation of the image after adjustment corresponding to a head roll of an angle of 45 degrees.

To achieve the rotation of disparities within a 3D image as described above with respect to FIGS. 4A and 5A, one of the right or left images of the 3D image may be warped/adjusted to attain the appropriate disparity direction. For simplicity, it will be assumed that the left image will remain unchanged by the image re-rendering process and that the right image will be modified according to embodiments of the present invention. However, some embodiments of the present invention may modify the left image and keep the right image unchanged, while other embodiments may modify both of the left and the right images.

For each pixel in the left image, the disparity specifies the position of the pixels in the right image, with the exception of occluded points. Thus, each pixel in the right image may be repositioned based on the nominal position in the left image, and based on the disparity estimated from the image pair.

Figure 7:
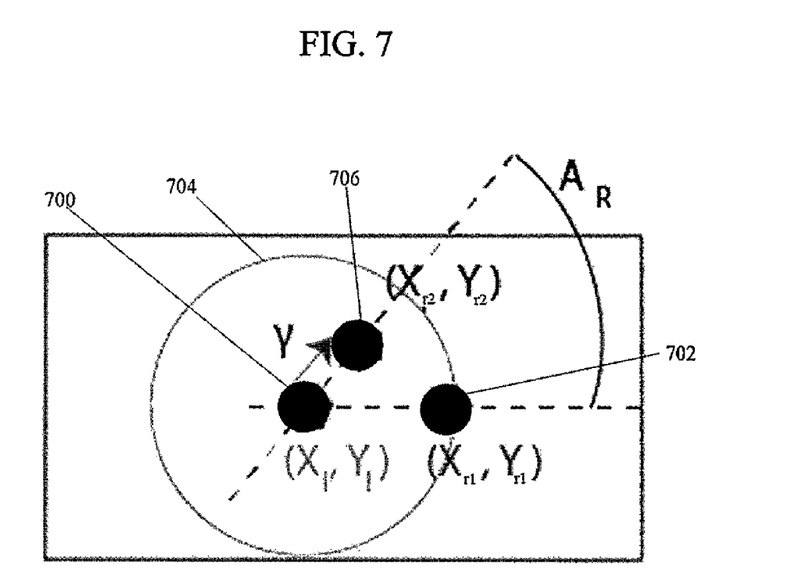
FIG. 7 illustrates an operation for warping/modifying a stereoscopic image in response to head roll, according to an embodiment of the present invention.

FIG. 7 illustrates an operation for warping/modifying a stereoscopic image in response to head roll, according to an embodiment of the present invention.

Given a measured disparity between a point shown in the right and left images, the position of the pixels in the right image are repositioned based on the disparity ($\Delta$), the gain factor ($\gamma$), and the head roll angle ($A_R$) with reference to the position of the left image. At the conclusion of the operation, all disparities will have the same orientation as that of the interocular axis of a viewer regardless of the gain factor.

Referring to FIG. 7, the warping operation is determined by the following formulas:

Original Disparity: $\Delta = X_1 - X_{r1}$

Disparity Gain Factor: $\gamma = 1$ or $\gamma = \cos(A_r)$

Warped Right Image Position: $X_{r2} = X_1 + \gamma \Delta^* \cos(A_R)$; $Y_{r2} = Y_1 + \gamma \Delta^* \cos(A_R)$ Wherein $X_1$ and $Y_1$ represent X-Y coordinates of a pixel of an original left image, $X_{r1}$ and $Y_{r1}$ represent X-Y coordinates of a pixel of an original right image, $X_{r2}$ and $Y_{r2}$ represent X-Y coordinates of a warped/adjusted pixel of a right image, $A_R$ represents an angle of head roll of a viewer, and $\gamma$ represents a disparity gain factor.

The warping operation according to the present embodiment calculates the new right eye view based on the left eye view.

The above equations describe one method of warping a left image to create a new right image according to an embodiment of the present invention. Other embodiments may utilize other formulas to achieve warping.

In cases in which an edge of an object of an image is shifted, the shifting may occlude or unocclude a region behind it. In cases of occlusion, information may be simply discarded as a result. In cases of unocclusion, the missing information may be estimated to avoid holes in the image. Texture in-filling algorithms may be used to fill the unoccluded regions with statistically similar texture as that of the regions abutting the unoccluded regions. The infilling techniques may include texture stretching, statistical texture generation, texture copying, or other techniques know to those skilled in the art.

Although the warping operation embodied by the above equations is effective in generating a desired magnitude and direction of disparity, the warping may introduce artifacts into an image. After a rotation, some edges of objects may shift and may occlude other content, or may reveal or unocclude portions of the image for which there is no valid information in the original right image.

In cases where a shifted edge occludes other content, it is desirable that these shifted pixels overwrite the occluded values. On the other hand, in situations in which a hole is opened in the image, a variety of techniques known in the art may be utilized to fill in the missing portions of the image, such as texture extrapolation of the unoccluded surface, recruitment of the missing pixel values from the left image, any of the infilling techniques mentioned above, or any other technique known to those skilled in the art.

In the present embodiment, the original disparity $\Delta$ is characterized by $X_1 - X_{r1}$, which is the disparity between the X-coordinate of the pixel of the left image and the X-coordinate of the pixel of the right image. This equation simply embodies the concept of disparity as discussed throughout the application, that is, the concept of localized positional differences between the right and left images.

Furthermore, the disparity gain factor ($\gamma$) may be 1 or may be $\cos(A_R)$ depending on whether full disparity is maintained at all head roll angles, or whether the disparity is attenuated according to the degree of head roll, respectively. The concepts of full disparity and attenuated disparity are discussed above with reference to FIGS. 4 and 5, respectively. The function of the disparity gain factor ($\gamma$) is that it decreases the amount and severity of artifacts that may occur as the degree of head roll increases.

For example, a person having ordinary skill in the art may attempt to limit disparity to less than 3% of the screen width. For a resolution that is 1920 pixels wide, this would correspond to about 60 pixels. Under an extreme head roll, it is possible to have a region as wide as 60 pixels that has been unoccluded, which presents an opportunity for objectionable artifacts. By throttling back the depth in proportion to the magnitude of the head roll, it is possible to greatly reduce the size of these regions that may be filled in.

Referring to FIG. 7, coordinates of a left image pixel 700 ($X_1$, $Y_1$) and coordinates of an original right image pixel 702 ($X_{r1}$, $Y_{r1}$) are shown. Circle 704 represents the full magnitude of the disparity, that is, the original disparity between the left image pixel 700 and the original right image pixel 702. During the warping process of the present embodiment, the left image pixel 700 remains static as the right image pixel 702 is warped about, or relocated with respect to, the left image pixel 700 corresponding to the degree of head roll ($A_R$) of a viewer, thereby relocating the original left image pixel 700 to its new position shown by adjusted right image pixel 706. Additionally, the magnitude of the disparity between the left image pixel 700 and the adjusted right image pixel 706 is attenuated (when compared to the disparity between the left image pixel 700 and the original right image pixel 702) by the disparity gain factor ($\gamma$), as illustrated by the adjusted right image pixel 706 not being located on the full magnitude circle 704, which has a radius that is equal to the distance between the left image pixel 700 and the original right image pixel 702.

In some embodiments of the present invention, the operation for warping a stereoscopic image in response to head roll, as shown in FIG. 7 and as embodied by the above equations, may be used in situations with large head roll (e.g., $A_R$ greater than about 45 degrees) or strong attenuation (e.g., $\gamma$ less than about 0.5). As shown in FIG. 7, the location of the adjusted right image pixel 706 is closer to the left image pixel 700 than it is to the original right image pixel 702.

Those having skill in the art will understand that the above operation for warping/modifying a stereoscopic image in response to head roll according to the embodiment of the present invention shown in FIG. 7 is not limited to warping a single pixel or a single point of an image, as the warping of a single pixel as disclosed above is merely used for purposes of demonstration. The operation of the present embodiment may be applied to any disparity map having any number of points or pixels of disparity between a right image and a left image (e.g., a complex disparity map).

In the embodiment of the present invention shown in FIG. 7, the pixels of the left image are warped to create the adjusted right image. Also, after the adjusted disparity map having the adjusted right image pixel 706 is generated, the original right image pixel 702 is no longer used for displaying a 3D image. And by extension, after the adjusted disparity map is generated, the original right image is no longer used for displaying a 3D image. One exception is that the original right image may be used for infilling unoccluded regions.

Figure 8:
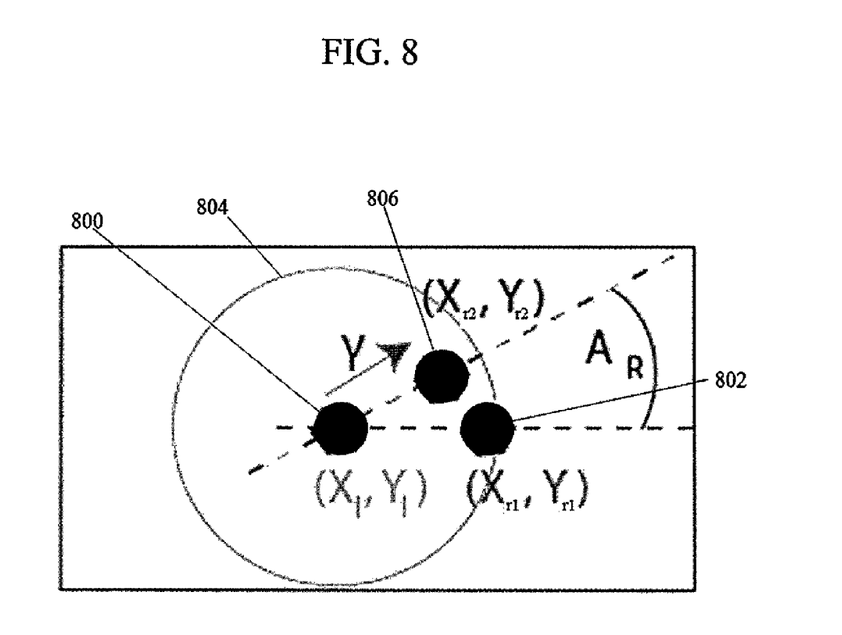
FIG. 8 illustrates an operation for modifying a stereoscopic image in response to head roll, according to another embodiment of the present invention.

FIG. 8 illustrates an operation for warping a stereoscopic image in response to head roll according to another embodiment of the present invention.

Referring to FIG. 8, the warping operation is determined by the following formulas:

Original Disparity: $\Delta = X_1 - X_{r1}$

Disparity Gain Factor: $\gamma = 1$ or $\gamma = \cos(A_r)$

Warped Right Image Position: $X_{r2} = X_{r1} - \Delta * \sqrt{[1 + \gamma^2 - 2\gamma * \cos(A_R) - \gamma^2 \sin^2(A_R)]}$;

$Y_{r2} = Y_1 + \gamma \Delta * \cos(A_R)$

Wherein $X_1$ and $Y_1$ represent X-Y coordinates of a pixel of an original left image, $X_{r1}$ and $Y_{r1}$ represent X-Y coordinates of a pixel of an original right image, $X_{r2}$ and $Y_{r2}$ represent X-Y coordinates of a warped/adjusted pixel of a right image, $A_R$ represents an angle of head roll of a viewer, and $\gamma$ represents a disparity gain factor.

The warping operation according to the present embodiment of the present invention calculates the new right-eye view based on the original right-eye view, thereby using less aggressive image warping in instances of small viewer head roll, as compared to the embodiment of the present invention shown in FIG. 7.

Locations of a left image pixel 800 ($X_1$, $Y_1$) and an original right image pixel 802 ($X_{r1}$, $Y_{r1}$) are shown. Circle 804 represents the full magnitude of the disparity (i.e., the original disparity) between the left image pixel 800 and the original right image pixel 802. During the warping process of the present embodiment, the left image pixel 800 remains static, while the right image pixel 802 is warped about, or moved with respect to, the right image pixel 802 corresponding to the degree of head roll ($A_R$) of a viewer, thereby relocating the original right image pixel 802 to its new position depicted by adjusted right image pixel 806. Additionally, the magnitude of the disparity between the left image pixel 800 and the adjusted right image pixel 806 is attenuated (when compared to the disparity between the left image pixel 800 and the original right image pixel 802) by the disparity gain factor ($\gamma$), as illustrated by the adjusted right image pixel 806 not being located on the full magnitude circle 804.

In some embodiments of the present invention, the operation for warping a stereoscopic image in response to head roll, as shown in FIG. 8 and as embodied by the above equations, may be used in situations with relatively minor head roll (e.g., $A_R$ less than about 45 degrees) or weak attenuation (e.g., $\gamma$ greater than about 0.5). As shown in FIG. 8, the location of the adjusted right image pixel 806 is closer to the original right image pixel 802 than it is to the left image pixel 800.

Those having skill in the art will understand that the above operation for warping/modifying a stereoscopic image in response to head roll according to the embodiment of the present invention shown in FIG. 8 is not limited to warping a single pixel or a single point of an image, as the warping of a single pixel as disclosed above is merely used for purposes of demonstration. The operation of the present embodiment may be applied to any disparity map having any number of points or pixels of disparity between a right image and a left image (e.g., a complex disparity map).

In the embodiment of the present invention shown in FIG. 8, the pixels of the original right image are warped to create the adjusted right image. The left image is used for the disparity map estimation, but the adjusted right image is based on a warp of the original right image. And after a disparity map using an adjusted right image is generated, and the adjusted right image has been rendered, the original right image is no longer used for displaying a 3D image.

In another embodiment of the present invention, the image warping may be based predominately on the right view, but regions from the original left image may be used to fill in texture in unoccluded regions of the warped right image.

Furthermore, the embodiments of the present invention shown in FIGS. 7 and 8 may be combined or used in conjunction in other embodiments of the present invention. For example, in an embodiment of the present invention, the warping operation shown in FIG. 7 may be used in situations where viewer head roll is greater than or equal to about 45 degrees, while the warping operation shown in FIG. 8 may be used in situations where viewer head roll is less than about 45 degrees.

Figure 9A:
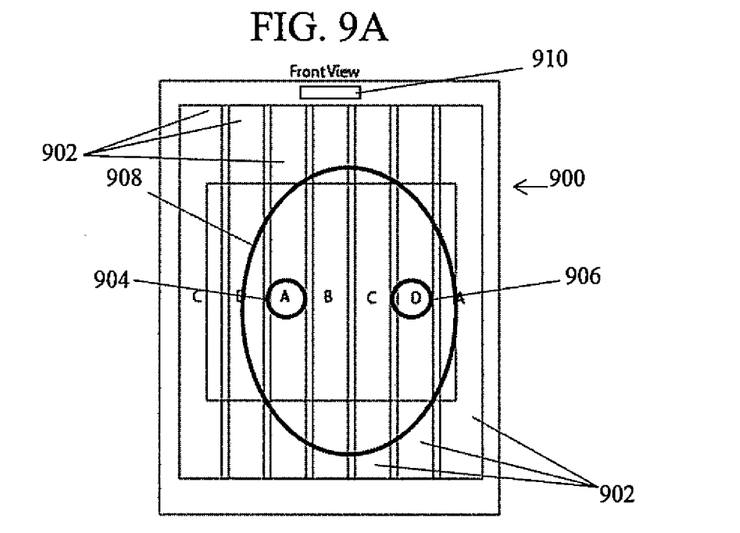
FIGS. 9A and 9B illustrate a front view of an autostereo display, according to an embodiment of the present invention.
Figure 9B:
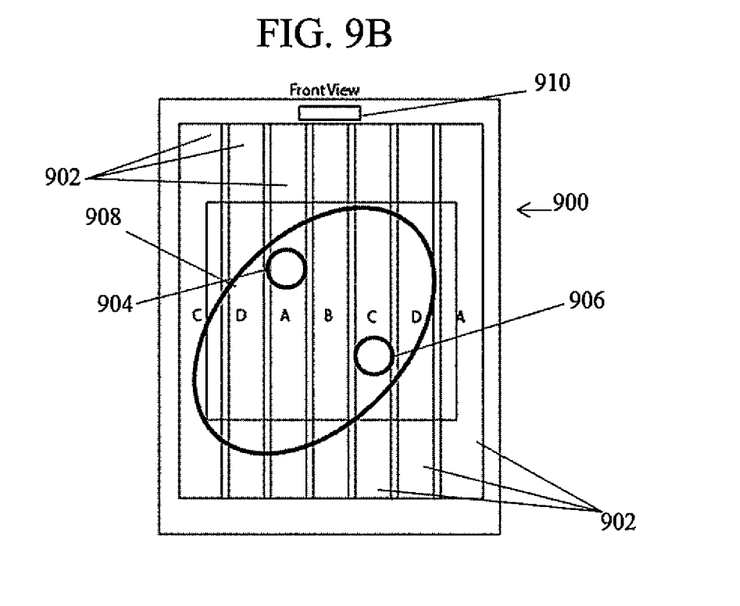

FIGS. 9A and 9B illustrate a front view of an autostereo display, according to an embodiment of the present invention.

Although the above embodiments have been primarily directed toward 3D displays that are viewed through 3D eyewear that selectively filters images for each eye of a viewer, other embodiments of the present invention may be used with autostereoscopic images, that is, 3D images that may be perceived in the absence of eyewear.

In an autostereo display, a subset of pixels is visible to each eye due to the geometrical configuration of the pixels, and due to a secondary component, such as an opaque bather, or a lenticular array, that is positioned between the pixels and the viewer. Within certain zones (or "sweet spots") in front of the autostereo display, each eye respectively sees corresponding images. In conventional auto stereo displays, these zones are horizontally narrow, have a limited depth, and have an elongated height.

In conventional one-eye tracking autostereo displays, a camera may detect where a person is located with respect to a front of the display to ensure that the appropriate right and left views are visible from the respective viewing zones where the right and left eyes are located. In particular, the display may allocate right and left images to the pixels in the viewing zones where the right and left eyes are located, respectively.

FIG. 9A illustrates an example of a viewer 908 of an autostereo display 900 that has no head roll. Referring to FIG. 9A, the autostereo display 900 includes viewing zones 902 and a camera 910 for tracking the position of the viewer 908 in front of the display 900. FIG. 9A depicts the viewer 908 from the back of the viewer 908 (that is, the display is shown through an outline 908 representing the viewer). The viewer's interocular axis between the viewer's left eye 904 and the viewer's right eye 906 is horizontal, indicating that the viewer 908 does not exhibit any head roll. The viewer's left eye 904 is positioned in viewing zone A, and the viewer's right eye 906 is positioned in viewing zone D, as the viewer 902 watches the autostereo display.

FIG. 9B illustrates an example of head roll of the viewer 908 of the autostereo display 900. Referring to FIG. 9B, the viewer 908 exhibits head roll to the viewer's right-hand side (i.e., the user's head is tilted to the right), resulting in the viewer's right eye 906 shifting to viewing zone C, while the viewer's left eye 904 remains in viewing zone A. In conventional autostereo displays, the display would simply present a right image to the right eye 906 through viewing zone C without adjusting for the viewer's head roll. According to the present embodiment of the present invention, as the viewer 908 executes the head roll, the camera 910 may not only detect that the right eye 906 shifts to viewing zone C, but may also measure the degree of head roll of the viewer 908. The autostereo display 900 may then warp the right image to adjust for the rolled head position, and may then present the warped right image in viewing zone C.

Figure 10:
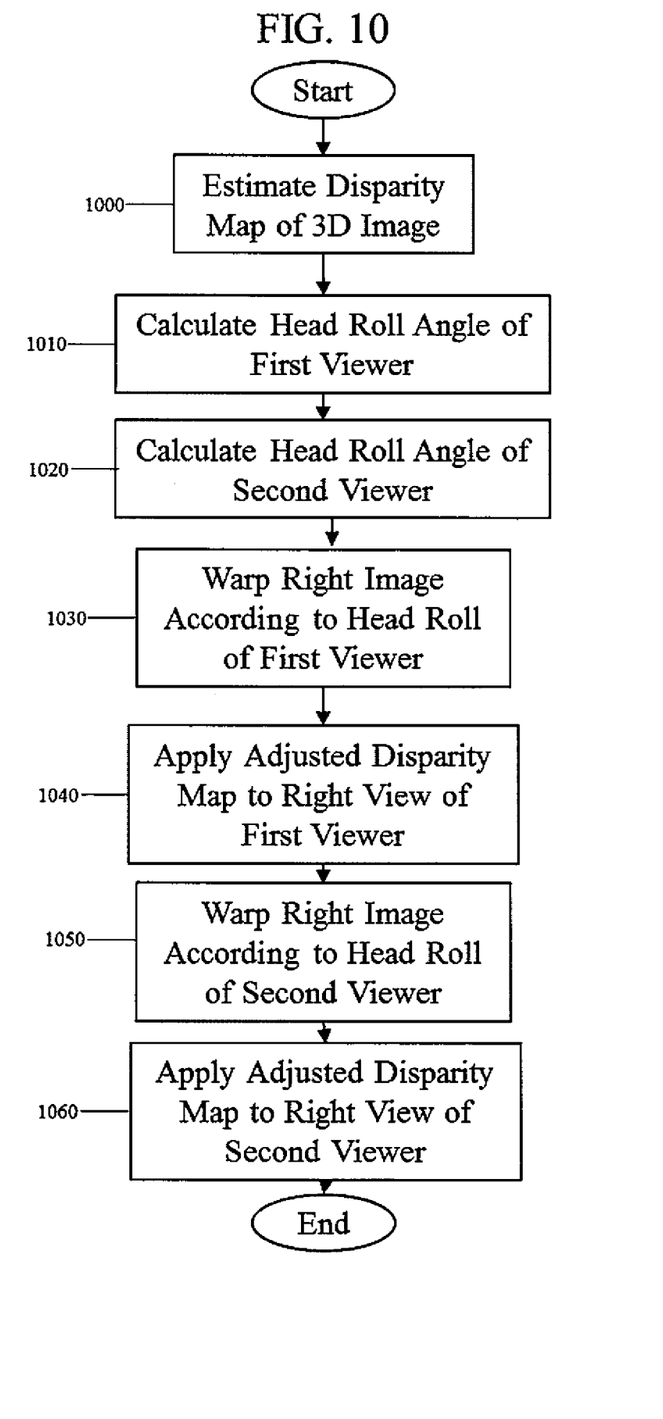
FIG. 10 is a flow chart illustrating a method for adjusting stereoscopic images, according to another embodiment of the present invention.

FIG. 10 is a flow chart illustrating a method for adjusting stereoscopic images according to another embodiment of the present invention.

Although the above embodiments have been primarily directed toward use by a single viewer, other embodiments of the present invention adjust stereoscopic images in response to multiple viewers' individual head rolls when watching a multi-viewer 3D display.

With multi-viewer 3D displays, viewers may observe 3D images using active shutter glasses. These active shutter glasses may allow individual viewers to perceive a right-eye image corresponding to the individual viewer while blocking right-eye images corresponding to other viewers of the display. Furthermore, because each viewer is able to perceive an individualized right-eye image, the display may maintain a common left-eye image for all viewers and modify the right-eye images for individual viewers according to different head rolls of the different viewers. A 3D display capable of adjusting images for multiple viewers having different head rolls may be a 3D display having a relatively high refresh rate (e.g., a 240 Hz 3D television).

Referring to FIG. 10, in operation 1000, the disparity map of a 3D image is estimated. The angle of the head roll of the first viewer is calculated in operation 1010. In operation 1020, the angle of the head roll of the second viewer is calculated. In operation 1030, the right image of the 3D image is warped according to the head roll of the first viewer, while the left image remains static. In operation 1040, the adjusted disparity map corresponding to the first viewer is applied to the right view of the first viewer. In operation 1050, the right image of the 3D image is warped according to the head roll of the second viewer, and the left image remains static. In operation 1060, the adjusted disparity map corresponding to the second viewer is applied to the right view of the second viewer.

By warping the right image and leaving the left image untouched, the left image may be shared with more than one viewer, while the differing right images for the viewers may be re-rendered for each individual viewer. Accordingly, instead of operating at 60 Hz*2 views*number of viewers, a 3D display according to embodiments of the present invention may operate at 60 Hz*(1+number of viewers), which may result in increased brightness and increased driving speed with multiple viewers. Engineering the system with a shared left image permits a display with a fixed frame rate to show images for more viewers. Alternatively, it allows a display with an adjustable frame rate to allocate more time per image and thus increase the time-average image brightness.

In other embodiments of the present invention, the left image is warped while the right image remains static. Furthermore, the respective adjustment of the disparity map for each individual viewer (i.e., the warping of the right image) may occur when the respective angles of head rolls of the first and second viewer exceed a threshold head roll angle (e.g., about 10 degrees of head roll). For example, adjustment may occur for the first viewer but not for the second viewer when the first viewer's head roll exceeds the threshold angle and when the second viewer's head roll does not exceed the threshold angle.

Although FIG. 10 refers to only a first and second viewer, embodiments of the present invention may accommodate any number of viewers. Moreover, although FIG. 10 shows serial processing of the images for the first and second viewers, the system may be designed to calculate the first viewer and the second viewer's views in parallel following operation 1000.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A stereoscopic display comprising:
a sensor configured to detect head roll of a viewer; and
an image renderer coupled to the sensor and configured to adjust a 3D image according to the detected head roll,
wherein the image renderer is configured to increasingly decrease magnitudes of disparities between a right image and a left image of the 3D image as an angle of the detected head roll increases,
wherein the image renderer is configured to adjust a direction of the disparities according to the angle by keeping the left image static and by relocating the right image with respect to the left image to form a relocated right image, and wherein the image renderer is configured to calculate coordinates of pixels of the relocated right image based on warning pixels of the right image when a disparity gain factor is greater than a reference gain factor and based on warping pixels of the left image when the disparity gain factor is less than or equal to the reference gain factor.

2. The stereoscopic display of claim 1, wherein the sensor is configured to measure the angle of the head roll by measuring a degree of rotation of an interocular axis of the viewer.

3. The stereoscopic display of claim 2, wherein the image renderer is configured to rotate the direction of the disparities between the right image and the left image to correspond to the degree of rotation of the interocular axis of the viewer.

4. The stereoscopic display of claim 1, wherein the image renderer is configured to calculate coordinates of pixels of the relocated right image based on warping pixels of the right image when the angle of the head roll is less than a reference head roll angle and based on warping pixels of the left image when the angle of the head roll is greater than or equal to the reference head roll angle.

5. The stereoscopic display of claim 1, wherein the image renderer is configured to adjust the 3D image when the angle of the detected head roll exceeds a threshold head roll angle.

6. A stereoscopic display comprising:
a sensor configured to detect a first head roll of a first viewer, and to detect a second head roll of a second viewer; and
an image renderer coupled to the sensor and configured to adjust a 3D image according to the first head roll, and to adjust the 3D image according to the second head roll,
wherein one of a left image or a right image of the 3D image is configured to be commonly seen by the first viewer and by the second viewer, and the other one of the left image or the right image is configured to be adjusted according to the first head roll to be seen by the first viewer and adjusted according to the second head roll to be seen by the second viewer, and
wherein the image renderer is configured to adjust a direction of disparities between the right image and the left image of the 3D image according to the first head roll, and to adjust the direction of the disparities between the right image and the left image according to the second head roll.

7. The stereoscopic display of claim 6, wherein the image renderer is configured to adjust the direction of the disparities by keeping the left image static and by relocating the right image with respect to the left image according to the first head roll to form a first relocated right image, and by relocating the right image with respect to the left image according to the second head roll to form a second relocated right image.

8. The stereoscopic display of claim 7, wherein the left image is configured to be commonly seen by the first viewer and by the second viewer,
wherein the first relocated right image is configured to be seen by the first viewer, and
wherein the second relocated right image is configured to be seen by the second viewer.

9. A method for adjusting a 3D image in response to head roll of a viewer, the method comprising:
detecting the head roll of the viewer; and
adjusting a 3D image according to the detected head roll,
wherein disparities between a right image and a left image of the 3D image is increasingly decreased as an angle of the detected head roll increases,
wherein the image renderer is configured to adjust a direction of the disparities according to the angle by keeping the left image static and by relocating the right image with respect to the left image to form a relocated right image, and
wherein the image renderer is configured to calculate coordinates of pixels of the relocated right image based on warping pixels of the right image when a disparity gain factor is greater than a reference gain factor and based on warning pixels of the left image when the disparity gain factor is less than or equal to the reference gain factor.

10. The method of claim 9, wherein the angle of the detected head roll corresponds to a degree of rotation of an interocular axis of the viewer.

11. The method of claim 10, wherein the adjusting further comprises rotating the direction of the disparities between the right image and the left image to correspond to the degree of rotation of the interocular axis of the viewer.

12. The method of claim 9, wherein the 3D image is adjusted when the angle of the detected head roll exceeds a threshold head roll angle.

* * * * *